United States Patent [19]

Alberino et al.

[11] 3,930,097

[45] *Dec. 30, 1975

[54] NOVEL COMPOSITIONS AND PROCESS

[75] Inventors: Louis M. Alberino, Cheshire; William J. Farrissey, Jr., Northford; James S. Rose, Guilford, all of Conn.

[73] Assignee: The Upjohn Company, Kalamazoo, Mich.

[ * ] Notice: The portion of the term of this patent subsequent to Dec. 25, 1990, has been disclaimed.

[22] Filed: Aug. 21, 1974

[21] Appl. No.: 499,137

Related U.S. Application Data

[63] Continuation-in-part of Ser. No. 333,384, Feb. 16, 1973, abandoned, which is a continuation-in-part of Ser. No. 317,957, Dec. 26, 1972, abandoned, which is a continuation-in-part of Ser. No. 124,958, March 16, 1971, Pat. No. 3,708,458, which is a continuation-in-part of Ser. No. 75,667, Sept. 25, 1970, abandoned.

[52] U.S. Cl. ............ 428/260; 260/37 N; 260/63 N; 260/65; 427/331; 427/369; 427/370; 427/371; 427/384; 428/273; 428/290; 428/408; 428/474
[51] Int. Cl.².................................... C08G 20/32
[58] Field of Search ........... 161/88, 89, 92, 93, 227, 161/182, 197, 170; 260/65, 63 N, 37 N; 428/273, 260, 290, 408, 474; 427/331, 369, 370, 371, 384

[56] References Cited
UNITED STATES PATENTS

| | | | |
|---|---|---|---|
| 3,179,630 | 4/1965 | Endrey................... | 260/78 |
| 3,416,994 | 12/1968 | Chalmers et al................... | 161/227 |
| 3,575,923 | 4/1971 | Jones................................ | 260/65 X |
| 3,654,227 | 4/1972 | Dine-Hart....................... | 260/65 |
| 3,708,458 | 1/1973 | Alberino et al...................... | 260/65 |

*Primary Examiner*—Marion E. McCamish
*Attorney, Agent, or Firm*—James S. Rose; Denis A. Firth

[57] ABSTRACT

Heat resistant reinforced composites, including laminates, are described which comprise a reinforcing material and a polyimide, the latter being characterized by the recurring unit

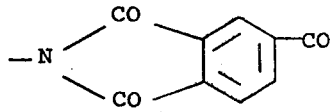

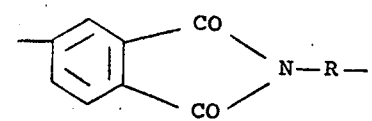

wherein 10–90 percent of the units have

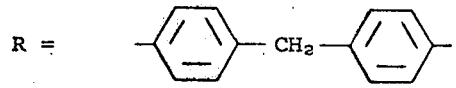

and the remainder have

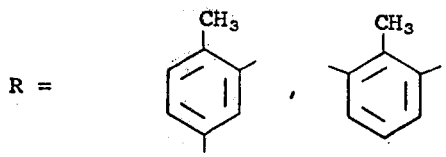

or a mixture of these.

23 Claims, No Drawings

NOVEL COMPOSITIONS AND PROCESS

CROSS-REFERENCE TO RELATED APPLICATION

This application is a continuation-in-part of copending application Ser. No. 333,384 filed Feb. 16, 1973, now abandoned which latter is in its turn a continuation-in-part of application Ser. No. 317,957 filed Dec. 26, 1972, now abandoned, which latter is in its turn a continuation-in-part of application Ser. No. 124,958 filed Mar. 16, 1971 now issued as U.S. Pat. No. 3,708,458, which latter is in its turn a continuation-in-part of application Ser. No. 75,667 filed Sept. 25, 1970, now abandoned.

BACKGROUND OF THE INVENTION

1. Field of the Invention

This invention relates to novel heat resistant composites and is more particularly concerned with composites which comprise a particular class of novel polyimides in combination with a reinforcing material.

2. Description of the Prior Art

In our aforesaid application Ser. No. 124,958, now U.S. Pat. No. 3,708,458, there is disclosed a series of copolyimides which are derived from benzophenone tetracarboxylic acid dianhydride (BTDA) and either a mixture of 4,4'-methylene-bis(phenyl isocyanate) and toluene diisocyanate (2,4 and/or 2,6-isomers) or a mixture of the corresponding diamines.

Said polyimides contain from 10 to 90 percent of the recurring units derived form 4,4'-methylenebis(phenyl isocyanate) or the corresponding diamine and the remainder derived from toluene diisocyanate or the diamine. The copolyimides of the aforesaid copending application possess, among other properties, excellent mold flow characteristics which render them especially useful in the preparation of molded articles particularly reinforced articles, laminates and the like.

It was also disclosed in said copending application that a certain group of said copolyimides, namely those in which from 70 to 90 percent of the recurring units were derived from BTDA and toluene diisocyanate or the corresponding diamine, possessed solubility in organic solvents in addition to enhanced structural strength properties, mold flow properties and the like as compared with the homopolyimides based on toluene diisocyanate or methylenebis(phenyl isocyanate) alone.

The solvent soluble materials are especially useful in the preparation of reinforced composites, particularly laminates.

SUMMARY OF THE INVENTION

This invention comprises heat resistant, reinforced composites which composites comprise, in combination, i. a copolyimide having the recurring unit

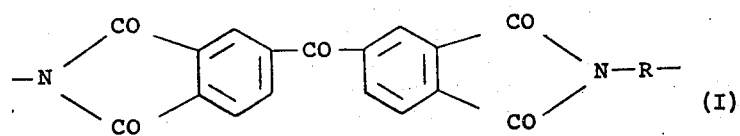

wherein from 10 to 90 percent of said recurring units are those in which R represents

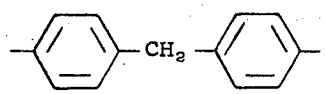

and the remainder of said units are those in which R represents a member selected from the group consisting of

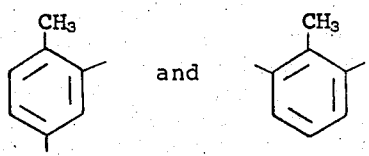

and mixtures thereof; and ii. a reinforcing material.

A particularly preferred embodiment of the invention comprises composites of the above type in which only from 10 to 30 percent of said recurring units are those in which R represents

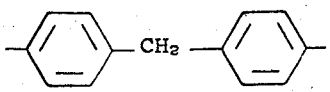

The composites of the invention can be employed for the fabrication of a wide variety of heat resistant articles such as bushings, seal faces, electrical insulators, compressor vanes and impellers, pistons, piston rings, gears, thread guides, cams, brake linings, clutch faces, abrasive articles and the like.

DETAILED DESCRIPTION OF THE INVENTION

The copolyimides having the recurring unit (I) can be prepared by the procedures which are described in detail in the aforesaid U.S. Pat. No. 3,708,458, the disclosures of which are hereby incorporated by reference in their entirety. Thus the various copolymides having the recurring unit (I) are obtained by condensing BTDA with a substantially stoichiometric amount of a mixture of toluene diisocyanate and methylenebis(phenyl isocyanate) or a mixture of the corresponding diamines under conditions which are described in detail in the aforesaid copending application. The relative molar proportions in which the toluene diisocyanate and the methylenebis(phenyl isocyanate) [or the corresponding diamines] are employed determines the proportion in which the recurring units corresponding to these starting materials occur in the ultimate copolyimide.

The reinforcing material employed in the composites of the invention can be a filler such as powdered aluminum, copper, graphite, molybdenum disulfide ($MoS_2$) and the like or, advantageously the reinforcing material can be fibrous in nature and, preferably, is prepared from or composed of high temperature resistant materials. Illustratively the reinforcing materials employed in the composites of the invention are fibrous materials prepared from quartz, metal, glass, boron, graphite, aromatic polyamides, polyimides or polyamide-imides, and the like. These fibrous reinforcing materials can be in the form of filaments, yarn, roving, chopped roving, knitted or woven fabrics and the like. The reinforcing material is used in an amount ranging from about 15 percent by weight to about 78.5 percent by weight of the total composites weight.

In general the reinforced composites of the invention are prepared by dry blending the reinforcing materials with powdered copolyimides having the recurring unit (I) and then subjecting the dry blend to fusion under pressure at a temperature which is at least as high as the glass transition temperature of the compolyimide.

As mentioned above, those copolyimides having the recurring unit (I) which are soluble in dipolar aprotic solvents are particularly useful in the preparation of the composites of the invention using fibrous reinforcing materials. Examples of dipolar aprotic solvents which can be used to prepare solutions of these polyimides are dimethylformamide, dimethylacetamide, dimethylsulfoxide, dimethylsulfone, hexamethylphosphoramide, N-methyl-2-pyrrolidone, tetramethylurea, pyridine, and the like.

The reinforced composites of the invention prepared from the solvent soluble copolyimides and fibrous reinforcing materials are generally prepared by contacting the reinforcing material with, or incorporating it into, a solution of the copolyimide in dipolar aprotic solvent, thereafter removing the solvent from the mixture and then subjecting the reinforcing material, impregnated with copolyimide, to fusion under pressure at a temperature which is at least as high as the glass transition temperature of the copolyimide.

In a particularly preferred embodiment of the invention there is produced a true laminate. Any of the methods previously employed in the art for the preparation of laminates from thermoplastics can be employed; see for example, Kirk-Othmer, Encyclopedia of Chemical Technology, Vol. 8, p. 185, The Interscience Encyclopedia, Inc., New York, 1952; Encyclopedia of Polymer Science and Technology, Vol. 2, p. 300, John Wiley & Sons, New York, 1965; ibid, Vol. 8, p. 121, 1968.

Illustratively, in one embodiment a plurality of layers of a woven fibrous reinforcing material are impregnated with a solution of a copolyimide having the recurring unit (I) hereinbefore defined for solubility in a dipolar aprotic solvent. Advantageously there is used a solution which contains from about 15 to about 25 percent by weight of copolyimide and this solution is applied to the reinforcing material in such amount as to deposit on the latter an amount of polyimide which corresponds to about 30 to about 50 volume percent, in combination with about 50 to about 70 volume percent of reinforcing material.

The impregnation of the fibrous reinforcing material with the copolyimide can be accomplished by any of the methods conventional in the art for such a process, i.e. by dipping, spraying, brushing, and other such methods of contacting the reinforcing material with the solution of copolyimide.

After the impregnation has been completed, the dipolar aprotic solvent is removed from the impregnated material by evaporation of about 95% of the solvent at 80° to 100°C and the remainder advantageously at a temperature near the boiling point of the solvent and under reduced pressure. The layers of impregnated fibrous reinforcing material ("prepreg") which are thus obtained are then assembled in overlapping relationship in a suitable mold of any desired configuration and are subjected to heat and pressure to produce the desired laminate. The pressures employed generally range from about 2,000 psi to about 3,000 psi and the temperatures are at least as high as the glass transition temperature of the copolyimide, i.e. of the order of about 310°C, and preferably are within the range of about 340°C to about 360°C.

A further embodiment for the production of a laminate allows for the presence of residual solvent in the prepreg layers before being assembled in a suitable mold or between the platens of a press. As much as about 15% solvent may remain in the layers. A plurality of the prepreg layers containing remaining solvent are assembled in overlapping relationship in a vented mold. Advantageously the latter is formed between the platens of a press. The assembled prepregs are then heated in the mold at temperatures above the boiling point of the particular solvent employed and advantageously of the order of about 200°C to about 250°C. This procedure is continued until the bulk of the solvent has been removed, i.e. the solvent content of the prepregs has been reduced to about 4 percent by weight or less. At this point the temperature in the mold is increased, preferably gradually, to the order of about 340°C to about 360°C and maintained thereat, with "bumping" (i.e. sudden momentary release of pressure by venting) until no further solvent remains. Thereafter, the material in the mold is subjected to pressures of the order of about 300 to 500 psi at a temperature in the same range as that employed in the second stage of solvent removal for a period of several minutes to several hours depending upon the particular polyimide components employed. The laminates so obtained are void free, high density, and have zero volatiles.

In yet another embodiment of the invention, high quality laminates with excellent physical properties are obtained using low pressure vacuum bag or moderate pressure autoclave vacuum bag methods of processing. A particular advantage which resides in this aspect of the invention is that it allows for the production of large size laminates without the need of expensive high pressure presses. The process is conducted by subjecting the laminate pack to vacuum rather than pressure during the heating or curing cycle and said process is well known by those skilled in the art; see Encyclopedia of Polymer Science, Vol. 2, p. 300, supra.

In corresponding manner, other composites of the invention can be prepared. Thus, where the reinforcing material is in the form of non-woven yarn or roving, the material is first impregnated with copolyimide as described above and then subjected to pressure molding under the conditions of pressure and heat described above. If desired, the impregnated roving or yarn can be chopped into relative short lengths, for example into lengths of one-quarter to several inches, and the chopped, impregnated material is subjected to molding. This particular embodiment is particularly useful where it is desired to orient the reinforcing material in a particular manner within the finished molding.

Where the reinforcing material in the composite is in the form of a particulate material such as a powdered metal, graphite, molybdenum disulfide and the like, or in the form of chopped roving or yarn, the composite is prepared by homogeneously blending the reinforcing material with the powdered copolyimide of recurring unit (I) and subjecting the dry blend to molding under the conditions described above in a suitable mold of any desired configuration.

It will be apparent to one skilled in the art that the above described procedures for the preparation of polyimide composites represent a marked advance over methods hitherto known in the art. This advantage flows from the fact that the copolyimides having the recurring unit (I) can be molded in a "chemically-finished" form. That is to say that polyimide composites hitherto prepared in the art could not be prepared readily from "chemically-finished" forms of polyimides nor were such polyimides hitherto known solvent soluble and/or thermoplastic. Accordingly it has hitherto been necessary to form the composite using a polyimide-prepolymer, or a polyamic-acid and to convert this prepolymer to a finished polyimide as part of the molding operation. Since the final conversion to polyimide has generally involved the generation of a substance such as water which is volatile under the conditions of molding, this has led to difficulties such as formation of voids in the molded part which have greatly detracted from structural strength and other properties of the latter.

In addition to the advantages inherent in the case of production of the composites of the invention, it is found that the structural strength, heat resistant and like properties of these composites are markedly superior to the properties of similar composites prepared from homopolyimides in which the group R in the recurring unit (I) is either wholly represented by

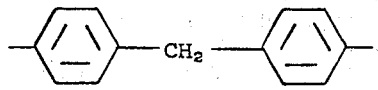

or wholly represented by

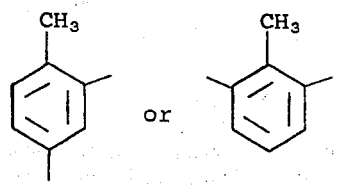

The following preparation and examples describe the manner and process of making and using the invention and set forth the best mode contemplated by the inventors of carrying out the invention but are not to be construed as limiting.

PREPARATION 1

A mixture of 128.9 g. (0.4 mole) of 3,3′,4,4′-benzophenone tetracarboxylic acid dianhydride, 1.5 g. of antioxidant (1,3,5-trimethyl-2,4,6-tris[3,5-di-t-butyl-4-hydroxybenzyl]benzene) and 750 ml. of N-methylpyrrolidinone was heated under an atmosphere of dry carbon dioxide to 85°C. A mixture of 55.75 g. (0.321 mole) of toluene-2,4-diisocyanate and 20.2 g. (0.081 mole) of 4,4′-methylenebis(phenyl isocyanate) was added dropwise over a period of 7 hours to the above solution with stirring. The temperature of the reaction mixture was maintained at 84°C throughout the addition and thereafter for a period of 17 hours. At the end of this time a small quantity (3.024 g.) of toluene-2,4-diisocyanate in 50 ml. of N-methylpyrrolidinone was added dropwise with stirring over a period of 6 hours. The temperature of the reaction mixture was maintained unchanged at 84°C during this second addition. After the addition was complete, the reaction mixture was allowed to cool to room temperature (circa 25°C) and was then diluted by the addition of 800 ml. of N-methylpyrrolidinone. The resulting solution was slowly added with stirring to 2000 ml. of isopropyl alcohol. The solid which separated was isolated by filtration, ground in a Waring blender and washed with two 2000 ml. portions of isopropyl alcohol. The solid precipitate was then dried in a vacuum oven for 24 hours at 190°C and a pressure of 0.2 to 0.5 mm. of mercury. There was then obtained 152 g. of a random copolyimide wherein approximately 80 percent of the recurring units had the structure:

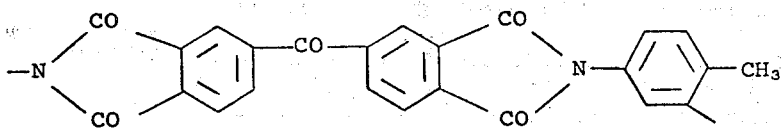

and approximately 20 percent of the recurring units had the structure:

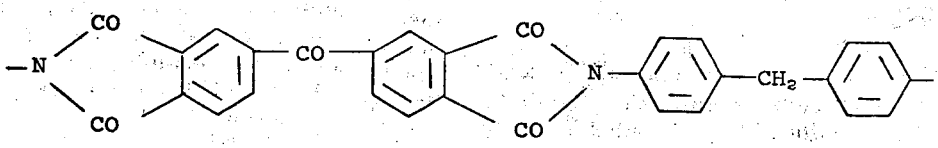

The copolyimide had an inherent viscosity of 0.4 (1 percent solution in dimethylsulfoxide).

EXAMPLE 1

A 10 ply polyimide-fiber glass laminate was prepared by first brushing a 20% solution of BTDA-80/20 TDI(-toluene diisocyanate)MDI[methylene(bis phenyl isocyanate)] polyimide (prepared as described in Preparation 1) dissolved in N-methylpyrrolidone (NMP) on one side of a single layer of 181E (A-1100)* fiber glass cloth held in tension on a hand coating machine. Solvent was removed by infrared heaters and the cloth turned over and the polyimide solution applied to the opposite side. Again the solvent was removed to yield a stiff fiber glass prepreg. Using this prepreg cloth, any number of layers may be laminated, but in this specific example, 10 layers were prepared using the following procedure.

*181E (A-1100) is a fiber glass cloth supplied by Burlington Glass Fabrics Co. and E designates the type of glass and 181 designates the weave; A-1100 is γ-aminopropyltriethoxysilane supplied by Union Carbide and acts as a coupling agent between the glass cloth and the polymer being applied.

Ten layers of prepreg were placed in a heated press and held 5 minutes at 340° to 360°C under 2,000 – 3,000 psi. The press was cooled and the resulting laminate had the following physical properties.

| Flexural Strength | psi | Room Temp. | 55.0 × 10³ |
| --- | --- | --- | --- |
| | | 550°F | 44.0 × 10³ |
| Flexural Modulus | psi | Room Temp. | 3.95 × 10⁶ |
| | | 550°F | 3.60 × 10⁶ |
| Interlaminar Shear | psi | | 2.3 × 10³ |
| Impact Strength-Notched | ft—lb/in. | | 23 |
| Oxygen Index | % | Downward burn | 90–100 |
| | | Upward burn | >70 |

| Heat Distortion Temp. (264 psi) | °C | ‖ to plane of weave | 500 |
| --- | --- | --- | --- |
| | | ⊥ to plane of weave | 378 |

EXAMPLE 2

A 10 ply polyimide-graphite cloth laminate was prepared using the procedure described in Example 1, Hitco G(G1550)* graphite cloth being used in place of fiber glass cloth. Ten individual graphite cloth prepreg layers were laminated using the same pressing conditions outlined in Example 1.

* Hitco G(G1550), a product of Hitco Co., is a graphite cloth having 99% minimum carbon content with a fiber diameter of 0.0003 inch.

| Flexural Strength | psi | 24.2 × 10³ |
| --- | --- | --- |
| Flexural Modulus | psi | 1.80 × 10⁶ |

EXAMPLE 3

A 10 ply polyimide-high temperature organic fabric (PRD-49)** laminate was prepared using a 16% solution of BTDA-80/20 TDI/MDI polyimide (prepared as described in Preparation 1) dissolved in NMP and the coating procedure described in Example 1 except that a small proportion of solvent was left in the prepreg. Ten plies of prepreg were placed in a press at 100°C and 200–250 psi. The following heat cycles were performed.

** See DuPont Bulletin A-80296. "PRD-49 is a temporary designation for a new organic fiber"; "no degradation of yarn properties in short term exposures up to temperatures of 500°F"

Increase temp. to 180°C, hold 1 hour
Increase temp. to 200°C, hold 1 hour
Increase temp. to 210°C, hold 1 hour
Increase temp. to 225°C, hold 1 hour
Increase temp. to 250°C, hold 1 hour
Cool to 150°C and demold.

EXAMPLE 4

A continuous strand fiber glass-polyimide molded composite was prepared using the following procedure.

Fiber glass roving was aligned on a glass plate and impregnated with enough of the NMP solution of 20% polyimide described in Example 1, so that when solvent was removed the prepreg after removal from the glass was 50% glass fiber by weight. Ten layers of prepreg were cut to fit a 5″ × 2½″ stainless steel mold and laid longitudinally in the mold. The molding conditions consisted of holding the mold for 5 minutes at 340° to 360°C under 2,000 – 3,000 psi. The mold was cooled and the resulting composite was demolded and found to have the following properties

| Flexural Strength | psi | 46.0 × 10³ |
| --- | --- | --- |
| Flexural Modulus | psi | 2.30 × 10⁶ |

EXAMPLE 5

A continuous strand graphite fiber* -polyimide molded composite was prepared using the procedure of Example 4 except the prepreg layer contained 70% by weight of graphite fiber. Ten layers of this prepreg were molded using the same procedure of Example 4 yielding a composite having the following properties

| Flexural Strength | psi | 149.0 × 10³ |
| --- | --- | --- |
| Flexural Modulus | psi | 17.2 × 10⁶ |

* Fortafil 5-T; a graphite roving supplied by Great Lakes Carbon Corporation

EXAMPLE 6

A continuous strand PRD-49* -polyimide molded composite was prepared using the procedure of Example 4 and the prepreg layer contained approximately 50% by weight of PRD-49 fiber, although a few percent of solvent was left in the layer. Ten layers of this prepreg were molded longitudinally in a 5″ × 2½″ stainless steel mold using a first mold cycle of 100°C at 200 – 250 psi followed by gradual increases in heat as outlined below.

* See Example 3

Increase temp. to 180°C, hold 1 hour
Increase temp. to 200°C, hold 1 hour
Increase temp. to 210°C, hold 1 hour
Increase temp. to 225°C, hold 1 hour
Increase temp. to 250°C, hold 1 hour
Cool to 150°C and demold to yield a composite having the following properties

| Flexural Strength | psi | 26.6 × 10³ |
| --- | --- | --- |
| Flexural Modulus | psi | 3.80 × 10⁶ |

EXAMPLE 7

A chopped fiber glass strand-polyimide molded composite was prepared by impregnating fiber glass roving with a 20% solution of BTDA-80/20 TDI/MDI polyimide (prepared as described in Preparation 1) dissolved in NMP. The amount of solution employed was adjusted so that when solvent was removed the fiber glass content was 70%. The prepreg fibers were chopped into short lengths of ½″. A 5″ × 2½″ stainless steel mold was charged with 70 g. of the chopped prepreg then pressed at 340° – 360°C under 2,000 – 3,000 psi for 5 minutes. The mold was cooled and opened to yield a composite having the following properties

| Flexural Strength | psi | $29.8 \times 10^3$ |
| Flexural Modulus | psi | $2.67 \times 10^6$ |

EXAMPLE 8

A chopped graphite fiber-polyimide molded composite was prepared by impregnating graphite fibers with a 20% solution of BTDA-80/20 TDI/MDI polyimide (prepared as described in Preparation 1) dissolved in NMP. The amount of solution employed was adjusted so that when solvent was removed the graphite fiber content was 70%. These prepreg fibers were chopped into short lengths of ½". A 5" × 2½" stainless steel mold was charged with 70 g. of the chopped prepreg then pressed at 340° – 360°C under 2,000 – 3,000 psi for 5 minutes. The mold was cooled and opened to yield a composite having the following properties

| Flexural Strength | psi | $13.3 \times 10^3$ |
| Flexural Modulus | psi | $3.00 \times 10^6$ |

EXAMPLE 9

A chopped fiber glass strand-polyimide molded composite was prepared by dry blending the powdered polyimide of BTDA-80/20 TDI/MDI (prepared as described in Preparation 1) with ¼ inch chopped glass strands so as to yield a dry blend which contained 20% by weight of chopped fiber glass. A 5" × ½"2½"stainless steel hold was charged with 70 g. of the blend and pressed at 340° – 360°C under 2,000 – 3,000 psi for 5 minutes. The mold was cooled and opened to yield a composite having the following properties

| Flexural Strength | psi | $20.2 \times 10^3$ |
| Flexural Modulus | psi | $0.95 \times 10^6$ |

EXAMPLE 10

A chopped fiber glass strand-polyimide molded composite was prepared as in Example 9 except that the dry blend contained 30% by weight in chopped fiber glass. The composite had the following properties

| Flexural Strength | psi | $20.8 \times 10^3$ |
| Flexural Modulus | psi | $1.26 \times 10^6$ |

EXAMPLE 11

A chopped fiber glass strand-polyimide molded composite was prepared as in Example 9 except the dry blend contained 40% by weight of chopped fiber glass. The composite had the following properties

| Flexural Strength | psi | $20.1 \times 10^3$ |
| Flexural Modulus | psi | $1.53 \times 10^6$ |

EXAMPLE 12

A chopped fiber glass strand-polyimide molded composite was prepared as in Example 9 except the dry blend contained 40% by weight of chopped fiber glass and 5% by weight of molybdenum disulfide ($MoS_2$). The composite had the following properties

| Flexural Strength | psi | $11.2 \times 10^3$ |
| Flexural Modulus | psi | $1.30 \times 10^6$ |

EXAMPLE 13

A chopped graphite fiber strand-polyimide molded composite was prepared by dry blending the powdered polyimide of BTDA-80/20 TDI/MDI (prepared as described in Preparation 1) with ¼ inch chopped graphite strands so as to yield a dry blend which contained 15% by weight of chopped graphite. A 5" × 2½" stainless steel mold was charged with 70 g. of the blend and pressed at 340° – 360°C under 2,000 – 3,000 psi for 5 minutes. The mold was cooled and opened to yield a composite having the following properties

| Flexural Strength | psi | $16.0 \times 10^3$ |
| Flexural Modulus | psi | $0.80 \times 10^6$ |

EXAMPLE 14

A polyimide molded composite containing chopped graphite fiber strand in combination with graphite powder was prepared by dry blending the powdered polyimide of BTDA-80/20 TDI/MDI (prepared as described in Preparation 1) with ¼ inch chopped graphite strands and graphite powder so as to yield a dry blend which contained 15% by weight of chopped graphite and 13% by weight of graphite powder. The powder was added to impart lubricity to the final molded piece and the chopped strand to offset the usual decrease in flexural strength associated with the use of graphite powder. A 70 g. sample of the blend was molded according to the procedure used in the previous examples and yielded a composite having the following properties

| Flexural Strength | psi | $14.2 \times 10^3$ |
| Flexural Modulus | psi | $0.90 \times 10^6$ |

EXAMPLE 15

A graphite powder-polyimide molded composite was prepared by dry blending the powdered polyimide of BTDA-80/20 TDI/MDI (prepared as described in Preparation 1) with 15% by weight of graphite powder. A 70 g. sample of the powder blend was molded in a 5" × 2½" stainless steel mold and pressed at 340° to 260°C under 2,000 – 3,000 psi for 5 minutes. The mold was cooled and opened to yield a composite having the following properties

| Flexural Strength | psi | $13.7 \times 10^3$ |
| Flexural Modulus | psi | $0.53 \times 10^6$ |
| Tensile Strength | psi | 10,500 |
| Compressive Strength | psi | 20,800 |

EXAMPLE 16

A molybdenum disulfide ($MoS_2$) powder-polyimide molded composite containing 15% by weight of $MoS_2$ was prepared according to the procedure of Example 15 to yield a composite having the following properties

| Flexural Strength | psi | $6.84 \times 10^3$ |
| Flexural Modulus | psi | $0.58 \times 10^6$ |

EXAMPLE 17

An aluminum powder-graphite powder-polyimide molded composite containing 50% by weight of aluminum powder and 28½% by weight of graphite powder was prepared according to the procedure of Example 15 to yield a composite having the following properties

| Flexural Strength | psi | $3.65 \times 10^3$ |
|---|---|---|
| Flexural Modulus | psi | $0.85 \times 10^6$ |

EXAMPLE 18

A 40 ply polyimide-fiber glass laminate was prepared by taking 40 layers of prepreg prepared in accordance with Example 1 except that 15% solvent (by weight) was left in the individual layers, and subjecting the 40 layers, placed one on top of another, to the following heating cycles in a vented closed mold formed by the platens of a press:
1. The mold and contents were heated for one-half hour at 250°C to reduce solvent level to less than 4%.
2. The mold and contents were then heated to 350°C and the mold was subjected to "bumping" repeatedly to release the remaining volatilized solvent.
3. The remaining product in the mold was held for 1 hour in the press at 350°C and 300–500 psi.

The laminate obtained was 0.33 inch thick, void free, high density and had zero volatiles content.

EXAMPLE 19

A 12 ply polyimide-fiber glass laminate was prepared by taking 12 layers of prepreg prepared in accordance with Example 1 except that 8–10% solvent (by weight) was left in the individual layers. Twelve layers of prepreg were packed on an aluminum plate 12" × 12" × 1", having a ⅜" × ½" channel running around, and 1" in from the edge of the plate. A tube leading through one side of the plate to the channel was connected to a vacuum pump. A Mylar* film was placed over the laminate pack and sealed to the plate on the 1" strip between the channel and edge with high temperature sealant to form a sealed vacuum bag. The platens of a press were used only to supply heat to the pack under the following curing cycles.
1. The vacuum was taken down to 25 inches of mercury and temperature held at 180°C for 4 hours.
2. The temperature was then raised to 200°C at 25 inches of mercury and held for 1 hour.
3. The laminate was removed from the vacuum bag and further cured starting at 200°C and increasing in 25°–30°C increments at 1 hour intervals to a maximum of 320°C

*Mylar is a DuPont trademark for poly(ethylene terephthalate).

The resulting laminate had the following properties

| Flexural Strength | psi | $39.4 \times 10^3$ |
|---|---|---|
| Flexural Modulus | psi | $2.13 \times 10^6$ |

We claim:
1. A heat resistant, reinforced composite comprising, in combination,
   i. from about 21.5 percent by weight to about 85 percent by weight of a copolyimide consisting essentially of the recurring unit

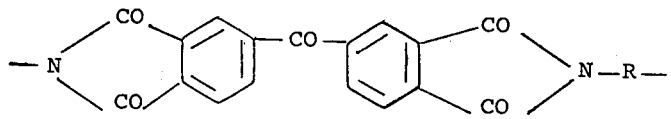

wherein from 10 to 90 percent of said recurring units are those in which R represents

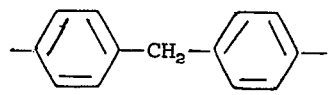

and the remainder of said units are those in which R represents a member selected from the group consisting of

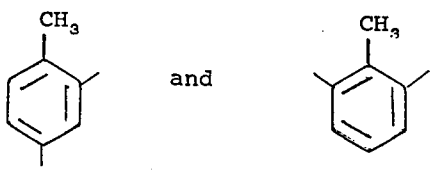

and mixtures thereof; and
   ii. from about 15 percent by weight to about 78.5 percent by weight of a reinforcing material.
2. A composite according to claim 1 in which the reinforcing material is fibrous.
3. A composite according to claim 1 in which the reinforcing material is chopped fiber glass.
4. A composite according to claim 1 in which the reinforcing material is chopped graphite fiber.
5. A composite according to claim 1 in which the reinforcing material is graphite powder.
6. A composite according to claim 1 in which the reinforcing material is molybdenum disulfide powder.
7. A composite according to claim 1 in which the reinforcing material is aluminum powder.
8. A heat resistant, reinforced composite comprising, in combination, (i) from about 21.5 percent by weight to about 85 percent by weight of a copolyimide consisting essentially of the recurring unit

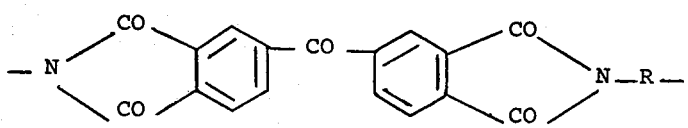

wherein from 10 to 30 percent of said recurring units are those in which R represents

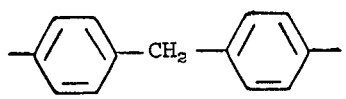

and the remainder of said units are those in which R represents a member selected from the group consisting of

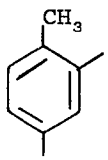 and 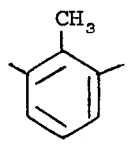

and mixtures thereof; and (ii) from about 15 percent by weight to about 78.5 percent by weight of a reinforcing material.

9. A composite according to claim 8 in which the reinforcing material is fibrous.

10. A composite according to claim 9 in which the reinforcing material is a glass fabric.

11. A composite according to claim 9 in which the reinforcing material is graphite fabric.

12. A composite according to claim 9 in which the reinforcing material is a high temperature resistant organic fabric.

13. A composite according to claim 9 in which the reinforcing material is fiber glass.

14. A composite according to claim 9 in which the reinforcing material is graphite fiber.

15. A composite according to claim 8 in which the reinforcing material is graphite powder.

16. A heat resistant reinforced laminate comprising a plurality of layers of a woven fibrous reinforcement embedded in a polyimide as defined in claim 8.

17. A laminate according to claim 16 wherein the reinforcement is fiber glass cloth.

18. A laminate according to claim 16 wherein the reinforcement is graphite cloth.

19. A laminate according to claim 16 wherein the reinforcement is a high temperature resistant organic fabric.

20. A process for the preparation of a laminate comprising the steps of: (i) impregnating a plurality of layers of a woven fibrous reinforcement with a solution in an organic solvent of a polyimide as defined in claim 8; (ii) removing the organic solvent from said impregnated layers; and (iii) fusing said plurality of layers under pressure at a temperature at least as high as the glass transition temperature of said polyimide.

21. A process according to claim 20 wherein the woven fibrous reinforcement is fiber glass cloth.

22. A process according to claim 20 wherein the woven fibrous reinforcement is graphite cloth.

23. A process according to claim 20 wherein the woven fibrous reinforcement is a high temperature resistant organic fabric.

* * * * *